US005238369A

United States Patent [19]
Farr

[11] Patent Number: 5,238,369
[45] Date of Patent: * Aug. 24, 1993

[54] LIQUID LEVEL CONTROL WITH CAPACITIVE SENSORS

[75] Inventor: James B. Farr, Ann Arbor, Mich.

[73] Assignee: Tecumseh Products Company, Tecumseh, Mich.

[*] Notice: The portion of the term of this patent subsequent to Sep. 8, 2009 has been disclaimed.

[21] Appl. No.: 920,832

[22] Filed: Jul. 28, 1992

Related U.S. Application Data

[63] Continuation-in-part of Ser. No. 618,164, Nov. 26, 1990, Pat. No. 5,145,323.

[51] Int. Cl.$^5$ .............................................. F04D 27/00
[52] U.S. Cl. .................................... 417/18; 417/32; 417/36
[58] Field of Search ..................... 417/18, 32, 36, 44

[56] References Cited

U.S. PATENT DOCUMENTS

| | | | |
|---|---|---|---|
| 2,409,073 | 10/1946 | Sias | 177/351 |
| 2,529,015 | 11/1950 | Goudime | 175/41.5 |
| 2,570,218 | 10/1951 | Draganjac | 73/304 |
| 2,852,937 | 9/1958 | Maze | 73/304 |
| 2,863,472 | 12/1958 | Vacoles | 137/392 |
| 3,073,160 | 1/1963 | Shawhan | 73/304 |
| 3,282,468 | 11/1966 | Karlen | 222/67 |
| 3,375,716 | 4/1968 | Hersch | 73/304 |
| 3,391,547 | 7/1968 | Kingston | 62/218 |
| 3,472,168 | 10/1969 | Inoue | 103/25 |
| 3,544,236 | 12/1970 | Brookmire | 417/32 |
| 3,588,859 | 6/1971 | Petree | 340/244 |
| 3,800,205 | 3/1974 | Zalar | 318/482 |
| 4,171,186 | 10/1979 | Chapman | 417/17 |
| 4,171,932 | 10/1979 | Miller | 417/36 |
| 4,244,385 | 1/1981 | Hotine | 137/1 |
| 4,245,188 | 1/1981 | Rottmar | 324/61 |
| 4,580,403 | 4/1986 | Hummel | 62/171 |
| 4,600,844 | 7/1986 | Atkins | 307/118 |
| 4,780,705 | 10/1988 | Beane | 340/620 |
| 4,881,873 | 11/1989 | Smith et al. | 417/36 |
| 5,145,323 | 9/1992 | Farr | 417/44 |

Primary Examiner—Richard A. Bertsch
Assistant Examiner—David W. Scheuermann
Attorney, Agent, or Firm—Baker & Daniels

[57] ABSTRACT

The present invention is a liquid level control system for selectively activating and deactivating a pump according to the liquid level indicated by capacitive sensors. Activating circuitry starts the pump motor when both upper and lower sensors indicate the presence of liquid. The pump motor is latched on by the activating circuitry and continues operation until the lower capacitive sensor indicates the absence of liquid, in which case the pump is shut off. A high frequency oscillator operates reliably over a wide range of operating conditions to maintain relatively constant charging time for the capacitive sensors.

31 Claims, 4 Drawing Sheets

LIQUID LEVEL CONTROL WITH CAPACITIVE SENSORS

CROSS-REFERENCE TO RELATED APPLICATIONS

The present application is a continuation-in-part of copending U.S. patent application Ser. No. 07/618,164, filed Nov. 26, 1990, now U.S. Pat. No. 5,145,323, assigned to the assignee of the present invention.

BACKGROUND OF THE INVENTION

1. Field of the Invention.

The present invention relates to control circuits for pump motors. More specifically, the field of the invention is that of liquid level control circuits which automatically maintain the liquid level within a predetermined range.

2. Description of the Related Art.

In sump and water tanks, for example, the liquid level should be maintained within a predetermined range for proper functioning of the tank. Many prior art devices automatically control the liquid level within the tank by activating a pump when the liquid rises above a first predetermined level and deactivating the pump when the liquid level falls below a second predetermined level. Some of the prior art devices use mechanical or moving parts such as mechanical switches operated by rubber diaphragms, springs, rods, floats, or balls, all of which may tend to wear out or malfunction over time.

Other prior art devices use electrical or optical probes positioned within the tank to determine the liquid level and control the pump accordingly. For example, self-heating thermistors or conductivity probes may be used. However, such prior art systems using probes may be sensitive to humidity, moisture, changing temperatures, and varying voltage levels in the sensing circuit, all of which may produce erroneous results and subject the probes to wear. Also, contamination of the probes may adversely effect their performance. The probes and their associated circuitry may be adjusted to improve performance, but making the adjustments may be inconvenient and expensive.

Employing capacitive sensors for liquid level control provides advantages including the prevention of triggering from transient water imbalances, such as splashes or waves, by precisely defining the required charging time of the capacitive sensors. However, the charging time may vary over operating temperatures in each unit, and similar units may vary in charging time because of variations in the electrical components of the control. Such variations may cause some controls to be activated falsely. In order to prevent any such occurrences, a desired feature of a liquid level control is to minimize variations in charging time, and therefore the time needed for actuation.

The charging time required for capacitive sensors is at least in part determined by the size of the resistors in the charging circuit. For applications which charge the capacitive sensors solely on the basis of the alternating current cycle (60 Hz), the resistances required are large in order to keep the capacitive sensors from completely charging every cycle. However, one problem with large resistances is that they are susceptible to receipt of radio frequency (RF) energy due to the antenna effect. The antenna effect or strays from the AC source may cause unexpected charging of capacitive sensors.

What is needed is a liquid level control which minimizes variations in actuation time.

Another need is for a liquid level control which reliably operates without the need for adjustment.

Also needed is a liquid level control which minimizes operating problems associated with contamination and mechanical wear.

A further need exists for a liquid level control which minimizes inaccuracies associated with varying temperatures and high resistances.

SUMMARY OF THE INVENTION

The present invention is a liquid level control system utilizing capacitive sensors which avoids the aforementioned problems. Activating circuitry starts the pump motor when both upper and lower sensors indicate the presence of liquid. The activating circuitry includes a high frequency oscillator circuit which determines the charging time of the capacitive sensors. The pump motor continues operation until the lower capacitive sensor indicates the absence of liquid, in which case the pump is shut off. A heatsink in the control circuitry provides a means for cooling a power semiconductor switch. The circuitry of the present invention operates reliably over a wide range of operating conditions.

One construction of a capacitive sensor includes having one electrode as a metal plate disposed in a plastic box enclosing the circuitry, and the other electrode as the pump case. This provides a simple and reliable capacitive sensor which is free of any problems of mechanical failure. Alternatively, a capacitive sensor may include an insulated wire capable of mounting at any position in the tank.

One electrode of the capacitive sensor disposed in the plastic box may be a suitably sized flat, U-shaped, or cup shaped metal plate. The plate acts as a heatsink for the liquid level control, particularly for the power switch, so that performance variations due to temperature are minimized. The plate is disposed on the bottom of the plastic box, in contact with the surface of the box which is generally in thermal contact with the water. Thus, the metal plate performs two functions, one as an electrode for the sensor and the other as a heat dissipating device.

One portion of the circuitry includes thermistors which can turn off the pump motor when a predetermined temperature is reached. This is particularly important when the system is operated in a circulating mode wherein the liquid pumped out of the tank is returned to the tank and the water temperature would otherwise become increasingly higher.

Another portion of the circuitry maintains switch terminal voltages within predetermined levels so that false triggering of the activating circuitry does not occur, which can be particularly troublesome at high operating temperatures. Also, another portion guards against damage to the power switch by ensuring voltages stay within rated limits.

Another aspect of the invention involves a high frequency oscillator which precisely maintains charging times for the capacitive sensors. The high frequency oscillator minimizes the resistances required to operate with the capacitive sensors. The lower resistances are less susceptible to influence by RF signals or AC power source variations.

The present invention is, in one form, an apparatus for controlling liquid levels comprising a pump, a motor drivingly connected to the pump, two sensors, an activating unit, and a heatsink. The first sensor detects the presence of liquid and is mounted at a first vertical position; it includes a capacitive circuit having two capacitive electrodes which produces a first signal indicative of the presence of liquid at the first position. The second sensor detects the presence of liquid and is mounted at a second, different vertical position; it includes a capacitive circuit having two capacitive electrodes which produce a second signal indicative of the presence of liquid at the second position. The activating unit enables the motor and is operably coupled to the sensors; it starts the motor to drive the pump when both of the sensor signals are produced, continues operation of the motor while at least one of the sensor signals are produced, and stops the motor when both sensor signals are no longer produced. The heatsink transfers heat generated by the activating unit to the surrounding liquid whereby the temperature of the activating unit is maintained within rating limits of its components so that variations in the response time of the activating unit are minimized.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
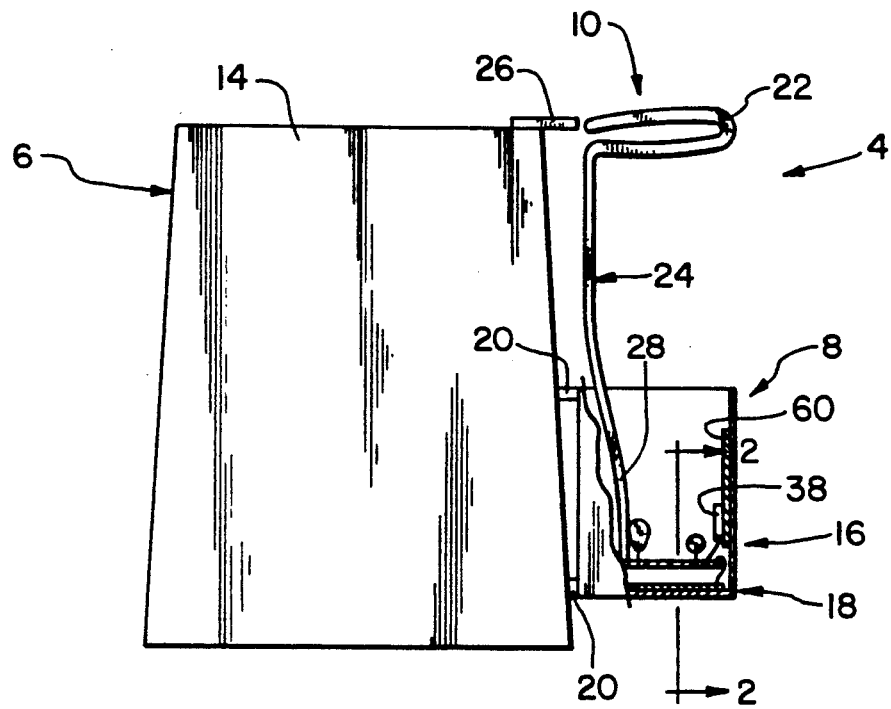
FIG. 1 is a side, elevational view, in partial cut-away, of the liquid control system of the present invention.

Corresponding reference characters indicate corresponding parts throughout the several views. The exemplifications set out herein illustrates preferred embodiments of the invention, in several forms, and such exemplifications are not to be construed as limiting the scope of the invention in any manner.

DESCRIPTION OF THE PREFERRED EMBODIMENT

The present invention comprises a liquid level control system adapted for use in a tank or other vessel in which the level of liquid is to be controlled. As depicted in FIG. 1, control system 4 includes pump 6, which can be a submersible sump pump, controller box 8, and upper sensor 10. The water in which control system 4 is immersed acts as a conductive medium. Pump 6 is disposed within the tank (not shown) in which the liquid level is to be controlled, and includes insulated motor 12 (see FIG. 3) located within pump casing 14. Controller box 8 is also disposed within the tank, and is preferably attached to casing 14. Circuit board assembly 16 and lower sensor 18 are disposed within box 8. Box 8 is spaced away from pump casing 14 by mounting posts 20, and preferably box 8 is made of a dielectric material. Upper sensor 10 includes sensor portion 22 of insulated wire 24 which is vertically adjustable at an upper portion of pump casing 14 by means of mounting bracket 26. Sensor portion 22 is electrically coupled to circuit board 16 via connecting portion 28 of insulated wire 24.

Figure 2:
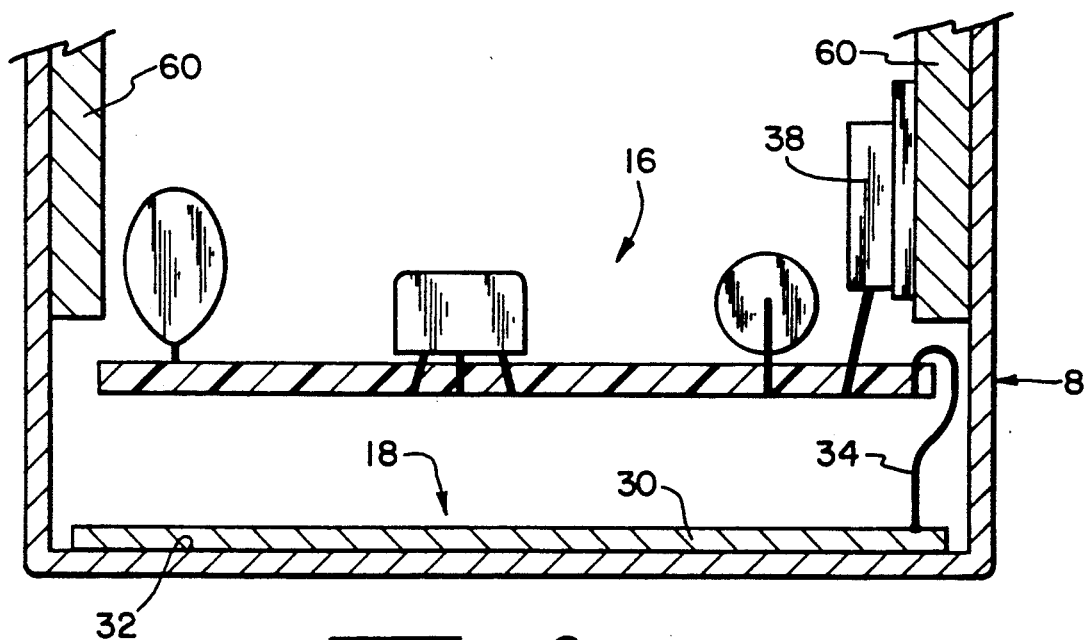
FIG. 2 is an enlarged cross-sectional view taken along view lines 2—2 of FIG. 1.

FIG. 2 shows the arrangement of lower sensor 18. Metal plate 30 is located on bottom wall 32 of box 8 and is separated from any liquid adjacent bottom wall 32 by the dielectric barrier formed by the material of box 8, which is preferably plastic or the like. Printed circuit board assembly 16 is secured vertically above plate 30 and is connected to metal plate 30 by electrical wire 34. Epoxy potting compound exists between circuit board assembly 16 and metal plate 30 so that assembly 16 and plate 30 are electrically isolated.

Figure 3:
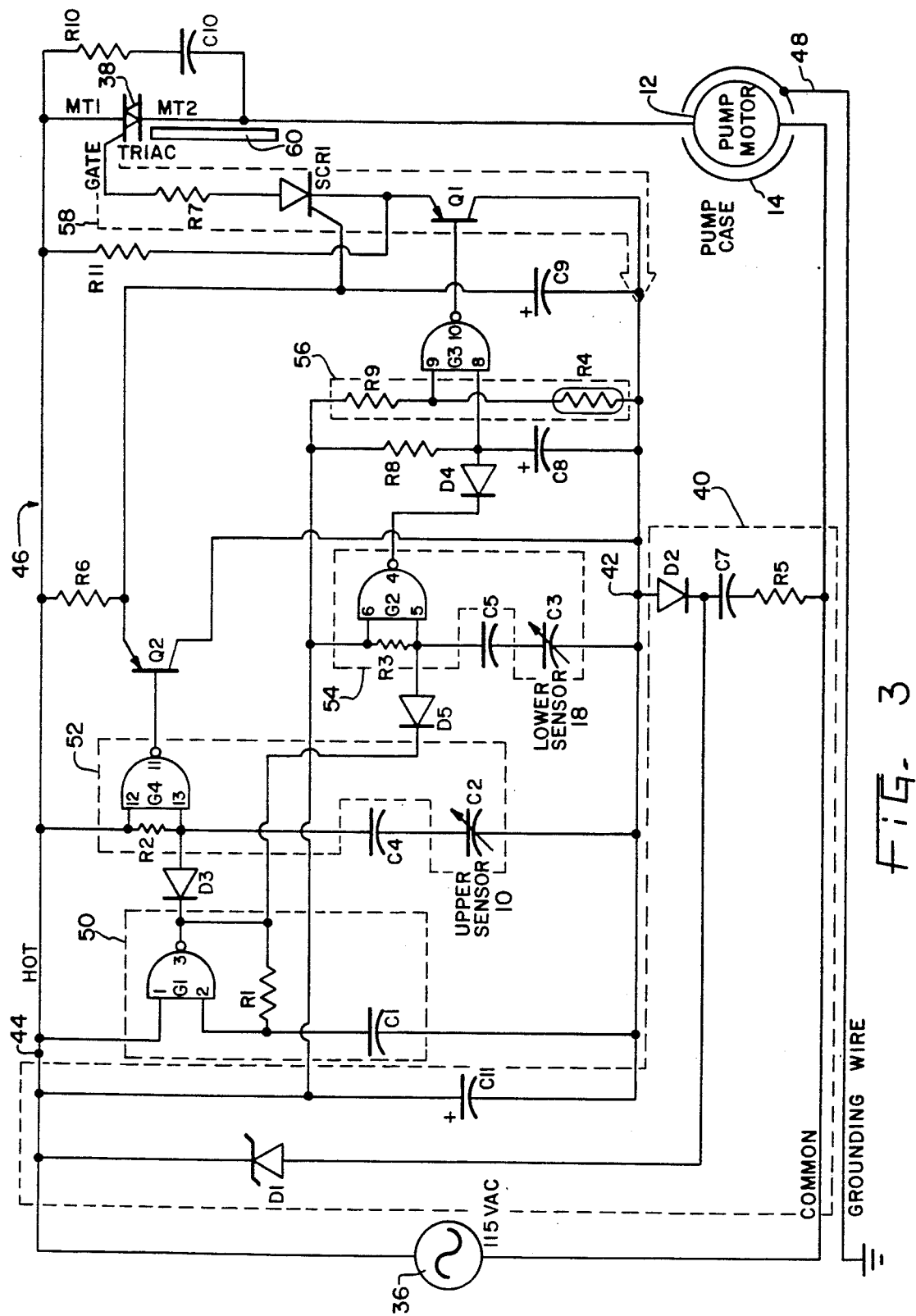
FIG. 3 is a schematic circuit diagram of the control circuitry of the present invention.

FIG. 3 shows the circuitry of the present invention, most of which is generally located on circuit board assembly 16. Alternating current (AC) power supply 36 is selectively electrically coupled to pump motor 12 by triac 38. Direct current (DC) power supply 40 converts alternating current from AC power supply 36 to a direct current bus between DC positive terminal 44 and DC negative terminal 42. Activating circuitry, referred to generally by numeral 46, is connected to the direct current bus and selectively activates triac 38 according to the states of upper and lower capacitive sensors C2 and C3 as described in more detail below. Grounding wire 48 is connected to pump case 14 to provide a ground for the AC circuit through pump motor 12. A more detailed description of the circuitry of the present invention is provided below by describing the arrangement and operation of activating circuitry 46.

Also shown in FIG. 3, activating circuitry 46 includes astable multivibrator 50 and monostable multivibrators 52 and 54. Astable multivibrator 50 includes NAND gate G1, resistor R1, and capacitor C1. NAND gate G1 has input pin 1 coupled to DC positive terminal 44, input pin 2 coupled to one terminal of resistor R1 and one terminal of capacitor C1, and output pin 3 coupled to the cathode of diode D3, the cathode of diode D5, and the other terminal of resistor R1. The other terminal of capacitor C1 is coupled to DC negative terminal 44. The coaction of R1 and C1 causes output pin 3 of NAND gate G1' to change state at a much higher frequency than the frequency of line voltage from AC power supply 36.

Monostable multivibrator 52 includes NAND gate G4, resistor R2, and upper sensor capacitor C2. NAND gate G4 has input pin 12 coupled to DC positive terminal 44 and one terminal of resistor R2, input pin 13 coupled to the other terminal of resistor R2, the anode of diode D3, and the series circuit of capacitors C2 and C4, and output pin 11 coupled to the base of transistor Q2. The series circuit of capacitors C2 and C4 includes one terminal of capacitor C4 coupled to input pin 13 of NAND gate G4, the other terminal of capacitor C4 coupled to one terminal of capacitor C2, and the other terminal of capacitor C2 coupled to DC negative terminal 42.

Monostable multivibrator 54 includes NAND gate G2, resistor R3, and lower sensor capacitor C3. NAND gate G2 has input pin 6 coupled to DC positive terminal 44 and one terminal of resistor R3, input pin 5 coupled to the other terminal of resistor R3, the anode of diode D5, and the series circuit of capacitors C3 and C5, and output pin 4 coupled to the cathode of diode D4. The series circuit of capacitors C3 and C5 includes one terminal of capacitor C5 coupled to input pin 5 of NAND gate G2, the other terminal of capacitor C5 coupled to one terminal of capacitor C3, and the other terminal of capacitor C3 coupled to DC negative terminal 42.

Capacitors C4 and C5 are not needed to achieve the desired functionality of monostable multivibrators 52 and 54. As a precautionary measure, however, capacitors C4 and C5 are included in activating circuitry 46 to limit the amount of current which could potentially pass through the liquid in case that insulation on the plastic case adjacent the sensor plates or on any of the sensor wires is damaged.

NAND gate G3 is coupled to monostable multivibrator 54 via diode D4, wherein the anode of diode D4 is coupled to input pin 8 of NAND gate G3. Resistor R8 is also coupled between DC positive terminal 44 and input pin 8, and capacitor C8 is coupled between input pin 8 and DC negative terminal 42. Input pin 9 of NAND gate G3 is coupled to voltage divider 56, which includes resistor R9 coupled between DC positive terminal 44 and input pin 9, and negative temperature coefficient (NTC) thermistor R4 coupled between input pin 9 and DC negative terminal 42. Output pin 10 of NAND gate G3 is coupled to the base of transistor Q1.

Transistor Q1 is disposed in negative gate current path circuit 58 to switch the gate current of triac 38. Triac 38 conducts AC line current when current flows through negative gate current path circuit 58. Current path circuit 58 includes the gate of triac 38 which is coupled to one terminal of resistor R7, the other terminal of resistor R7 which is then coupled with the anode of SCR1, the cathode of SCR1 which is then coupled to the emitter of transistor Q1, and the collector of transistor Q1 which is finally coupled to DC negative terminal 42. Further, resistor R11 has one terminal coupled to DC positive terminal 44 and the other terminal coupled to the cathode of SCR1 and the emitter of transistor Q1 for maintaining the emitter of transistor Q1 at several tenths of a volt above DC negative terminal 42 when Q1 is in a conductive state.

SCR1 also switches current path circuit 58 by means of capacitor C9, resistor R6, and transistor Q2. Capacitor C9 has one terminal coupled to DC negative terminal 42 and the other terminal coupled to the gate of SCR1, one terminal of resistor R6, and the emitter of transistor Q2. This arrangement allows capacitor C9 to charge from DC positive terminal 44 through resistor R6, and discharge when the base of transistor Q2 is conducting to the output terminal of NAND gate G4, through the collector of transistor Q2 which is coupled to DC negative terminal 42. When the base of transistor Q2 is not conducting, voltage on capacitor C9 rises to a voltage sufficient to trigger the gate of SCR1, thus closing current path circuit 58 from the gate of triac 38 to the emitter of transistor Q1.

DC power supply 40 includes capacitor C11, Zener diode D1, diode D2, capacitor C7, and resistor R5. DC positive terminal 44 is the same as the AC line labeled HOT, and DC negative terminal 42 is the negative terminal of electrolytic capacitor C11. Capacitor C11 is coupled between DC positive terminal 44 and DC negative terminal 42. The cathode of Zener diode D1 is coupled to DC positive terminal 44 and the anode of Zener diode D1 is coupled to the cathode of diode D2 and one terminal of capacitor C7. The anode of diode D2 is coupled to DC negative terminal 42, while the other terminal of capacitor C7 is coupled to one terminal of resistor R5. The other terminal of resistor R5 is coupled to the common return line (labeled COMMON) of AC power supply 36.

In accordance with the present invention, upper and lower sensors 10 and 18, respectively, comprise capacitive sensors C2 and C3, respectively. Upper capacitive sensor C2 includes the insulation on sensor portion 22 of insulated wire 24 which forms the electrode of capacitor C2, and the other electrode of capacitor C2 may include lead wires or other conductors having insulation, or alternatively pump casing 14 (with the insulated motor and circuit lead wires). Lower capacitive sensor C3 has metal plate 30 as one electrode and pump casing 14 (with the insulated motor and circuit lead wires immersed in water) as the other electrode. Alternatively, lower capacitive sensor C3 may have an insulated wire (similar to sensor portion 22 of upper sensor 10) as one electrode and pump casing 14 (with the insulated motor and circuit lead wires) as the other electrode. With the structure of upper and lower capacitive sensors C2 and C3, the sensing circuitry is much less vulnerable to physical contamination or physical wear.

In operation, the liquid level rises from an empty state due to external conditions, but pump 6 does not operate until after upper sensor 10 is submerged in liquid. When lower sensor 18 is covered by liquid, the capacitance of capacitive sensor C3 is sufficiently large that the voltage at input pin 5 of gate G2 does not exceed the trip threshold so that output pin 4 of gate G2 stays high. Diode D4 does not allow capacitor C8 to discharge, and resistor R8 is able to charge capacitor C8 above the trip voltage of gate G3 at input pin 8, causing output pin 10 of gate G3 to drop to a low voltage which is only slightly above negative DC terminal 42. Pin 10 of gate G3 can then receive current from the base terminal of transistor Q1 and activating circuitry 46 is then in an enabled state.

As the water level rises and reaches upper sensor 10, the capacitance of capacitive sensor C2 increases to a value such that the voltage at pin 13 of gate G4 does not exceed the trip threshold voltage. Consequently, pin 11 of gate G4 stays at a high voltage preventing transistor Q2 from conducting. Capacitor C9 charges through resistor R6, and as the voltage on C9 rises slightly above 1 volt, the gate of SCR1 receives a triggering current. Therefore, SCR1 conducts current which passes through a path including main terminal 1 (MT1) and the gate of triac 38, resistor R7, the anode-cathode of SCR1, and the emitter-collector of transistor Q1. Current path circuit 58 and resulting negative triac gate current causes triac 38 to conduct AC current through motor 12.

In operation, the liquid level drops from a full state wherein both capacitive sensors C2 and C3 are immersed and motor 12 is actively driving pump 6. Eventually, an electrode of the upper capacitive sensor C2 is uncovered, and pin 11 of gate G4 is tripped low toward the end of the AC cycle of astable multivibrator 50. Transistor Q2 conducts, periodically discharging capacitor C9. Resistor R11 causes transistor Q1 to have an emitter voltage about several tenths above that of DC negative terminal 42. The time constant of the circuit comprising resistor R6 and capacitor C9 is very large in comparison with discharge events occurring through transistor Q2 so that voltage on capacitor C9 is kept in a low state, removing the gate current source for SCR1. However, due to the SCR's latching characteristics, SCR1 remains in conduction without need for gate current and therefore triac 38 continues to supply current to the pump motor. Further, the gate voltage of SCR1 is the difference between the emitter voltage of transistor Q2 and the emitter voltage of transistor Q1. This voltage difference is a very low value when no gating current is desired. Since this gives the effect of a shorted gate-cathode, SCR1 may operate at high temperatures while eliminating the occurrence of false triggering.

After the water level has been pumped low enough to partially uncover an electrode of lower capacitive sensor C3, pin 4 of gate G2 drops to a low voltage near the end of the astable multivibrator cycle. With pin 4 of gate G2 low, capacitor C8 discharges thus causing the output pin 10 of gate G3 to go high. This turns off transistor Q1, thereby turning off SCR1 by decreasing its anode current to a value below its holding current. Without a triac gate current through SCR1, triac 38 drops out of conduction at the next zero crossing of the main terminals' current.

Resistor R9 and NTC thermistor R4 form voltage divider circuit 56 with input to pin 9 of gate G3. Thermistor R4 is placed in thermal contact with the case (not shown) of triac 38. If triac 38 exceeds a predetermined temperature and becomes overheated, thermistor R4 drops in resistance and lowers the voltage at pin 9 of gate G3 below the tip-off voltage, causing pin 10 of gate G3 to go high and thereby turning off Q1. Alternatively, R9 may be a positive temperature coefficient (PTC) thermistor in thermal contact with triac 38, and resistor R4 would then have a fixed resistance.

Triac 38 is attached to heat spreader 60 and is cooled by the liquid which surrounds the control box 8 and pump 6. Pump 6 may operate in a circulating mode whereby the liquid discharge of pump 6 is returned to the tank. In the circulating mode, the liquid temperature continually rises and may result in failure of motor 12 or activating circuitry 46 unless the heating process is interrupted. Thus, the thermistor in conjunction with input pin 9 of gate G3 forms both a motor protector and a circuit protector.

The values of the circuit elements shown in FIG. 3 are given below in Table 1:

| Element | Value |
| --- | --- |
| R1 | 220KΩ |
| R2 | 100KΩ |
| R3 | 100KΩ |
| R4 | NTC Thermistor (Keystone) RL1006-135.2K-138-D1 |
| R5 | 47Ω |
| R6 | 33KΩ |
| R7 | 220Ω |
| R8 | 100KΩ |
| R9 | 18KΩ |
| R10 | 220Ω |
| R11 | 18KΩ |
| C1 | 150pf |
| C2 | 50pf (UPPER SENSOR) |
| C3 | 50pf (LOWER SENSOR) |
| C4 | 0.0047 μf, 200v |
| C5 | 0.0047 μf, 200v |
| C7 | 2.0 μf, 200v |
| C8 | 2.2 μf, 16v |
| C9 | 2.2 μf, 16v |
| C10 | 0.1 μf, 200v |
| C11 | 470 μf, 16v |
| Q1,Q2 | 2N4126 |
| SCR1 | C103 |
| TRIAC | 8 Amp, 400v, Iso Tab; Teccor) Q4008L4 |
| G1,G2,G3,G4 | Quad 2-Input NAND Schmitt Trigger CD4093BE |
| D1 | 12v, 1w Zener IN4742 |
| D2 | IN4001 |
| D3 | IN4001 |
| D4 | IN4001 |
| D5 | IN4001 |

The attributes of NTC thermistor R4 include a resistance of 250 KΩ at 25° C. with a resistance ratio of 12 in the range of 0° C. to 50° C. If the alternative embodiment having R9 as a PTC thermistor is used, R9 would preferably have attributes including a resistance of 50 Ω at 25° C. with a transition temperature of 70° C. (for example, using a Keystone RL3006-50-70-25-PTO), and R4 would have a fixed resistance of 18 KΩ.

ALTERNATIVE EMBODIMENT

Figure 4:
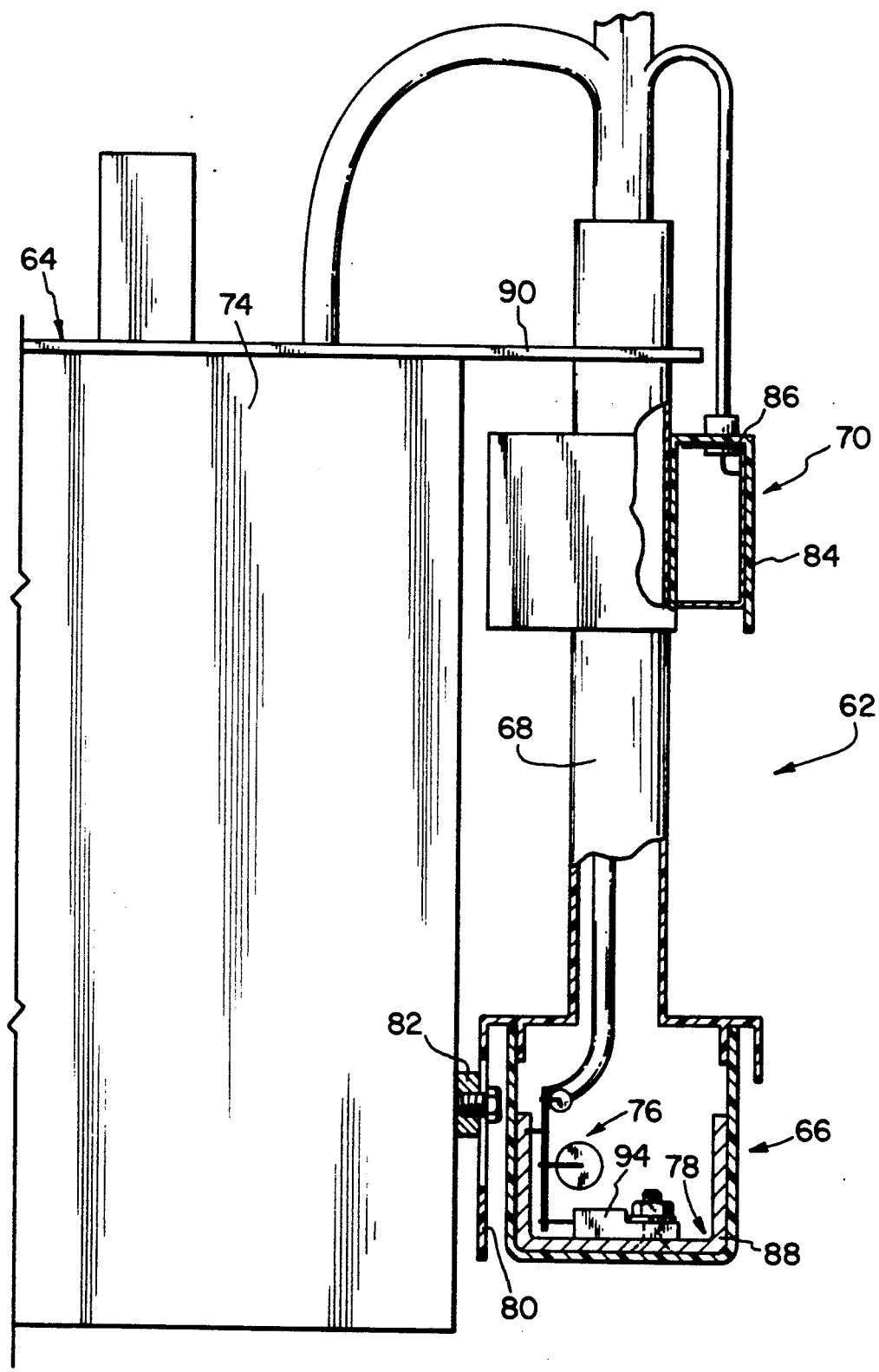
FIG. 4 is a side, elevational view, in partial cut-away, of an alternative embodiment of the liquid control system of the present invention.
Figure 5:
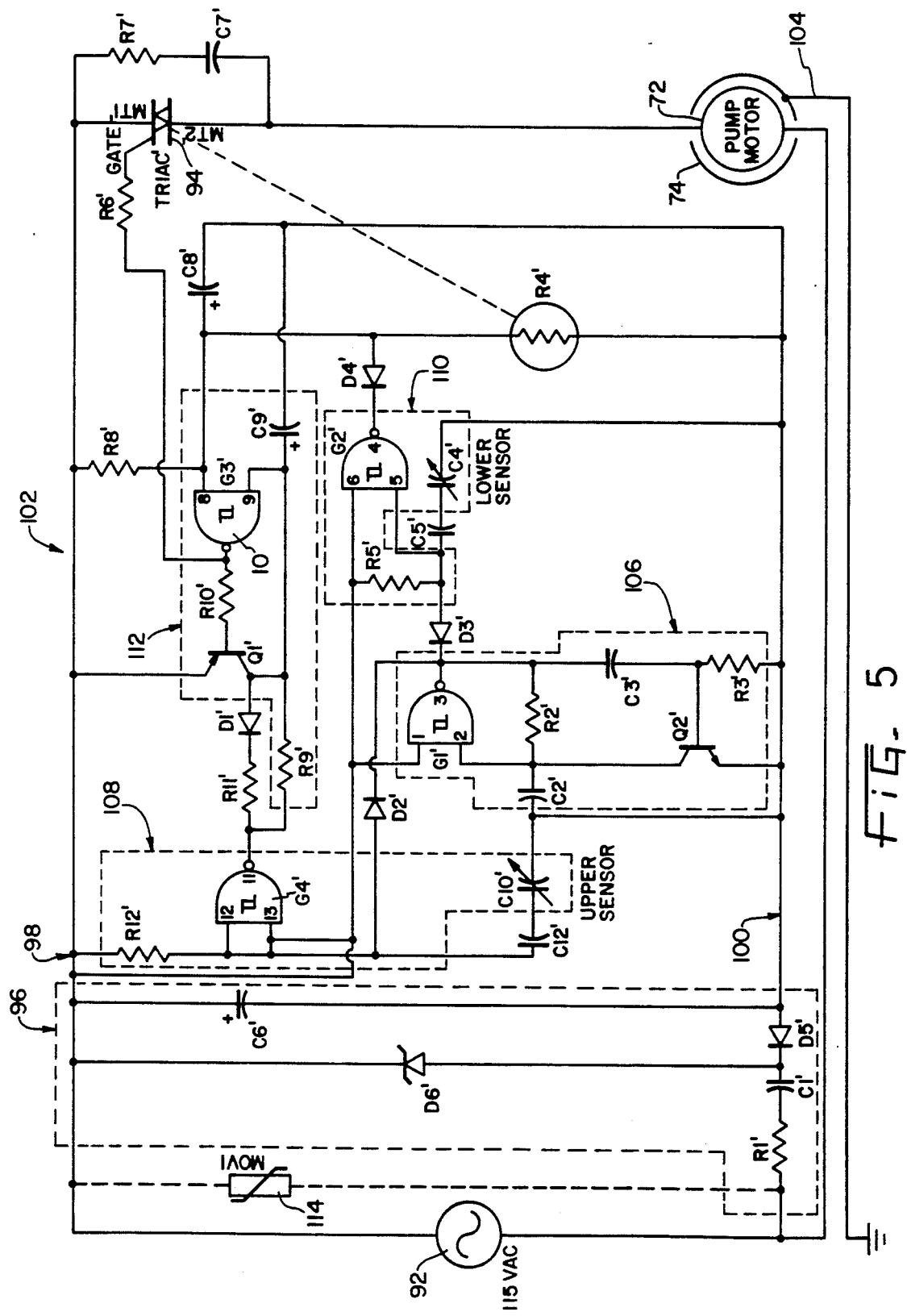
FIG. 5 is a schematic circuit diagram of the control circuitry of the embodiment of FIG. 4.

FIGS. 4 and 5 show an alternative embodiment of the present invention. The physical variations shown in FIG. 4 relate to the heatsink arrangement and sensor mounting arrangement of the liquid level control. This provides greater heat dissipation for the control circuitry, and the ability to change the location of the sensors and thereby adjust minimum and maximum water levels. The electrical circuit variations shown in FIG. 5 relate to the high frequency astable multivibrator and the latching circuitry. The activating circuitry of this alternative embodiment provides improved performance in terms of minimizing charging time variations by virtue of the higher frequency astable multivibrator, while the modified latching circuitry is less susceptible to variations due to temperature changes.

As depicted in FIG. 4, control system 62 includes pump 64, which can be a submersible sump pump, controller box 66, mounting tube 68, and upper sensor 70. The water in which control system 62 is immersed acts as a conductive medium. Pump 64 is disposed within the tank (not shown) in which the liquid level is to be controlled, and includes insulated motor 72 (see FIG. 5) located within pump casing 74. Controller box 66 is also disposed within the tank, and is preferably attached to casing 74 as described in more detail below. Circuit board assembly 76 and lower sensor 78 are disposed within box 66. Box 66 is spaced away from pump casing 74 by the attachment of bracket 80 to mounting posts 82, and preferably box 66 is made of a dielectric material such as plastic. Upper sensor 80 includes cover 84 having conductive element 86 which may be adjustably positioned vertically on mounting tube 68.

According to the present invention, lower sensor 78 comprises metal plate 88 which is in thermal contact with the power switching element of circuit board assembly 76, which in the embodiment of FIG. 5 is TRIAC'. Metal plate 88 may be a flat plate of sufficient area and thickness, or may have a U-shaped cross-section as depicted in FIG. 4 with the entire plate 86 having either a U-shaped or cup shaped structure. Metal plate 88 is located against the bottom wall of box 66, which is in thermal contact with cooling liquid at almost every point of time during operation of control system 62. For example, a sufficient amount of metal would be about 40 square centimeters (cm) of metal plate having a thickness of about 0.18 cm, preferably 1100 grade aluminum. However, since metal plate 88 also functions as one of the electrodes of lower sensor 78, TRIAC' must be an isolated triac or else an insulating washer (not shown) must be used to provide the needed electrical isolation.

According to another aspect of the present invention, the minimum and maximum water levels may be adjusted by means of bracket 80 and mounting tube 68, respectively. Bracket 80 spaces box 66 and plate 88 from pump casing 74 thereby electrically isolating the two, wherein pump casing 74 may be the other electrode for lower sensor 78; bracket 80 further includes a plurality of slots (not shown) located at various vertical positions for engaging mounting posts 82 which allows box 66 to be mounted at a plurality of vertical positions. Upper sensor 70 is slidably movable on tube 68 from the top of box 66 to an upper position adjacent to mounting tube guide 90 which is attached at the top of pump casing 74. Upper sensor 70 is held in a specific position by its interference fit around tube 68, although set screws or other attachments may also be used to fixedly position upper sensor 70.

FIG. 5 shows the circuitry of the alternative embodiment of the present invention, most of the circuitry being generally located on circuit board assembly 76. Alternating current (AC) power supply 92 is selectively electrically coupled to pump motor 72 by TRIAC' 94. Direct current (DC) power supply 96 converts alternating current from power supply 92 to a direct current bus between DC positive terminal 98 and DC negative terminal 100. Activating circuitry, referred to generally by numeral 102, is connected to the direct current bus and selectively activates triac 94 according to the states of upper and lower capacitive sensors C10' and C4' as described in more detail below. Grounding wire 104 is connected to pump case 74 to provide a ground for the AC circuit through pump motor 72. Activating circuitry 102 includes astable multivibrator 106, monostable multivibrators 108 and 110, and latching circuit 112.

In accordance with the present invention, astable multivibrator 106 includes NAND gate G1', capacitor C2' coupled to input pin 2 of gate G1', resistor R2' coupled between input pin 2 and output pin 3 of NAND gate G1', and a hiqh frequency oscillating circuit which includes transistor Q2', resistor R3', and capacitor C3'. The high frequency oscillating circuit is formed by C3' having one terminal coupled to output pin 3 of G1' and the other terminal coupled to one terminal of R3' and negative DC bus 100. The other terminal of R3' is coupled to the base of transistor Q2'. Q2' has its collector coupled to input pin 2 of G1' and the one terminal of C2', and its emitter coupled to negative DC bus 100 so that conduction of Q2' allows for C2' to discharge. The oscillating cycle of output pin 3 of NAND gate G1' determines the charging time of upper sensor C10' and lower sensor C4'.

When output pin 3 is high, diodes D2' and D3' are biased off and are non-conducting, allowing upper capacitor C10' to charge through resistor R12' and lower capacitor C4' to charge through resistor R5'. When output pin 3 is low, then diodes D2' and D3' are forward biased and no charging current reaches capacitive sensors C4' and C10'. This causes periodic conduction of Q2' and contributes to the reliability of the high frequency cycling of astable multivibrator 106 which is at a predetermined time period because of the high accuracy of the upper threshold of G1'. The accuracy of G1', which is preferably a Schmitt trigger device, is relatively constant from device to device and over various operating conditions so that temperature variations and manufacturing variations have only a minimal effect on the charging time. The high frequency of astable multivibrator 106 (preferably about 100 kiloHertz) allows for relatively small resistances to be employed.

Latching circuit 112 operates to maintain activation of activating circuitry 102 after the initial triggering condition (liquid contact with upper sensor 70) no longer exists by holding transistor Q1' in a conductive state after upper sensor 70 no longer contacts the liquid. Rather than requiring a latching current, the conduction of Q1' depends on the state of pin 10 of gate G3'. NAND gate G3' has its output pin 10 indirectly coupled to the base of transistor Q1' through resistor R10', and indirectly coupled to the gate of TRIAC' through resistor R6'. NAND gate G3' also has its input pin 8 coupled to capacitor C8' (which is in turn coupled to negative DC bus 100) and a voltage divider (which operates similarly to divider circuit 56 of FIG. 3) consisting of resistor R8' (also coupled to positive DC bus 98) and thermistor R4' (also coupled to negative DC bus 100); and gate G3' has its input pin 9 coupled to capacitor C9' and resistor R9'. The emitter of Q1' is coupled to positive DC bus 98, while the collector is coupled to input pin 9 of gate G3' as well as to R9', the anode of D1', and C9'.

Monostable vibrators 108 and 110 have a similar arrangement to monostable vibrators 52 and 54 of FIG. 3, including the precautionary arrangement of capacitors C12' and C5' to limit current in the event of a short through the controller case to the surrounding liquid. Monostable vibrator 108 is coupled to latching circuit 112 at output pin 11 to R9' and to the collector of Q1' through resistor R11' and the anode of diode D1'. Astable multivibrator 106 is coupled to monostable vibrator 108 such that output pin 3 of gate G1' is coupled to input pin 12 of gate G4' through the anode of diode D2'; and the oscillator circuit is coupled to monostable vibrator 110 such that output pin 3 of gate G1' is coupled to input pin 5 of gate G2' through the anode of diode D3'. Monostable vibrator 110 is coupled to latching circuit 112 at output pin 4 of gate G2' to input pin 8 of gate G3' through the anode of diode D4'.

In operation, the liquid level rises from an empty state due to external conditions, but pump 64 does not operate until after upper sensor 70 contacts, or is submerged, in liquid. When lower sensor 78 is covered by liquid, the capacitance of capacitive sensor C4' is sufficiently large such that the voltage at input pin 5 of NAND gate G2' does not exceed its threshold so that gate G2' does not trip and output pin 4 stays high. Transistor Q1' and NAND gate G4' do not allow capacitor C9' to charge and raise input pin 9 of NAND gate G3' above its threshold, so output pin 10 remains at a high potential and keeps TRIAC' 94 non-conductive.

As the liquid level rises and reaches upper sensor 70, the capacitance of C10' increases and capacitor C10', charging through R12', reaches voltage peaks which are insufficient to trigger NAND gate G4' and output pin 11 goes hiqh. This allows capacitor C9' to charge through resistor R9' which causes input pin 9 of NAND gate G3' to go high and therefore output pin 10 goes low. The low value of output pin 10 of G3' causes an activating current through TRIAC' 94, thus turning on pump motor 72. Also, transistor Q1' becomes conductive in a latching loop so that C9' is charged nearly to the positive DC bus by Q1'. Hence, input pin 9 of NAND gate G3' stays high even if output pin 11 of gate G4' goes low.

After activation of pump motor 72, the liquid level drops by virtue of the pumping and eventually an electrode of upper sensor 70 is removed from contact with the liquid. However, latching circuit 112 maintains activation of TRIAC' 94 and provision of current to pump motor 72 provided that lower sensor 78 remains in contact with the liquid. After the liquid has been pumped sufficiently to lower the liquid level below one of the electrodes of lower sensor 78, output pin 4 of NAND gate G2' goes low and allows C8' to discharge, breaking the latching loop by virtue of one of the NAND inputs having dropped too a low state. As a result, output pin 10 of NAND gate G3' goes high and terminates the activating current through the gate of TRIAC' 94 so that at the next zero-crossing of the alternating current, TRIAC' 94 becomes non-conductive.

Resistor R8' and NTC thermistor R4' form a voltage divider circuit coupled with input pin 8 of gate G3'. Thermistor R4'is placed in thermal contact with TRIAC' 94. If TRIAC' 94 exceeds a predetermined temperature and becomes overheated, thermistor R4' drops in resistance and lowers the voltage at input pin 8 of gate G3' below the trigger voltage, causing output pin 10 of gate G3' to go high and thereby turning off TRIAC' 94. Alternatively, R8' may be a positive temperature coefficient (PTC) thermistor in thermal contact with TRIAC' 94, and resistor R4' would then be have a fixed resistance.

AC power supply 92 may be a conventional 115 VAC power source, and DC power supply 96 includes Zener diode D6', diode D5', capacitor C1', and resistor R1' which are arranged similarly to the arrangement of DC power supply 40 of FIG. 3. In addition to AC power supply 92 and DC power supply 96 coacting to provide a DC bus to activating circuitry 102, protection device (metal oxide varistor, or MOV1) 114 may be connected across the AC mains to guard against voltage spikes from AC power supply 92.

The values of the circuit elements shown in FIG. 5 are given below in Table 2:

TABLE 2

| Element | Value |
|---------|-------|
| R1' | 22Ω |
| R2' | 33KΩ |
| R3' | 4.7KΩ |
| R4' | NTC Thermistor (Panasonic) ERT-D2FIL154S |
| R5' | 100KΩ |
| R6' | 820Ω |
| R7' | 820Ω |
| R8' | 20KΩ |
| R9' | 220KΩ |
| R10' | 150KΩ |
| R11' | 10KΩ |
| R12' | 150KΩ |
| C1' | 0.68 μf, 250v |
| C2' | 150pf |
| C3' | 22pf |
| C4' | 50pf (LOWER SENSOR) |
| C5' | 4,700pf, 500v |
| C6' | 470 μf, 16v |
| C7' | 0.1 μf, 250v |
| C8' | 0.68 μf, 35v |
| C9' | 0.68 μf, 35v |
| C10' | 50pf (UPPER SENSOR) |
| C12' | 4,700pf, 500v |
| Q1',Q2' | MPS 4126 |
| TRIAC' | 8 Amp, 400v, Iso Tab; (Teccor) Q4008L4 |
| G1'-G4' | Quad 2-Input NAND Schmitt Trigger CD4093BE |
| D1'-D4' | IN4148 or 1N914 |
| D5' | IN4001 |
| D6' | 12v, 1w Zener IN4742 |
| MOV1 | Siemens S07K230 or Panasonic ERZCO7DK361U |

The attributes of NTC thermistor R4' include a resistance of 250 KΩ at 25° C. with a resistance ratio of 12 in the range of 0° C. to 50° C. If the alternative embodiment having R8' as a PTC thermistor is used, R8' would preferably have attributes including a resistance of 50Ω at 25° C. with a transition temperature of 70° C. (for example, using a Keystone RL3006-50-70-25-PTO), and R4' would have a fixed resistance of 18 KΩ.

It should be understood that the signals generated by the capacitive sensing circuits that activate and deactivate the pump control circuitry can be of any form, such as voltage levels as disclosed, logic levels, polarity, current levels, etc. The present invention is not limited to the disclosed embodiment.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for controlling liquid levels, said apparatus comprising:
    a pump;
    a motor drivingly connected to said pump;
    first sensor means for detecting the presence of liquid and mounted at a first vertical position, said first sensor means including a capacitive circuit having two capacitive electrodes, said first sensor means producing a first signal indicative of the presence of liquid at said first position;
    second sensor means for detecting the presence of liquid and mounted at a second vertical position, which is different than said first vertical position, said second sensor means including a capacitive circuit having two capacitive electrodes, said second sensor means producing a second signal indicative of the presence of liquid at said second position;
    means for activating said motor, said activating means operably coupled to said first and second sensor means, said activating means starting said motor to drive said pump when both of said first and second signals are produced by said first and second sensors, said activating means for continuing operation of said motor while at least one of said first and second signals are being produced, and said activating means stopping said motor when both said first and second signals are no longer produced; and
    heatsink means for absorbing heat generated by said activating means whereby the temperature of said activating means is maintained relatively constant so that variations in response time of said activating means is minimized.

2. The system of claim 1 wherein said pump further includes an outer case, and one of said electrodes for each of said first and second sensor means includes said pump outer case.

3. The system of claim 1 wherein said activating means includes means for stopping said motor when the temperature of said system exceeds a predetermined level.

4. The system of claim 1 wherein said activating means includes means for minimizing the occurrence of false triggering caused by high temperatures.

5. The system of claim 1 wherein said first sensor means includes a monostable multivibrator.

6. The system of claim 1 wherein said second sensor means includes a monostable multivibrator.

7. The system of claim 1 wherein at least one of said electrodes for one of said first and second sensor means is vertically moveable.

8. The system of claim 7 wherein said pump includes mounting means for adjustably positioning said vertically moveable electrode.

9. The system of claim 1 further comprising a dielectrically isolated box attached to said pump and said heatsink means is disposed within said box.

10. The system of claim 9 wherein said activating means includes power switching means for providing electric power to said motor, and said power switching means is disposed in thermal contact with said heatsink means.

11. The system of claim 9 wherein said heatsink means includes a conductive plate disposed in thermal contact with said box.

12. The system of claim 11 wherein one of said capacitive electrodes for said first sensor means includes said conductive plate.

13. The system of claim 1 further including latching means for coupling said motor to a power source, said latching means including first, second, and gate terminals, said first and second terminals coupled in a series circuit relationship with said motor and the power source, said gate terminal coupled to said activating means, whereby said latching means closes said series circuit when activated by said activating means.

14. The system of claim 13 wherein said latching means further includes a switch means for maintaining said latching means in a closed state, said switch means coupled to said activating means whereby after said latching means closes said series circuit, said switch means maintains said latching means in said closed state when said activating means indicates at least one of said first and second signals are being produced.

15. The system of claim 14 wherein said latching means further includes enabling means for enabling the closure of said latching means, said enabling means coupled to said activating means whereby after neither of said first and second signals are produced, said enabling means allows the closure of said series circuit when said activating means indicates the higher vertically mounted one of said first and second sensor means are producing one of said first and second signals.

16. The system of claim 14 wherein said activating means includes means for adjusting to ambient temperature changes, said adjusting means coupled to said switch means whereby the switching of said switch means is relatively unaffected by temperature or manufacturing variations.

17. The system of claim 16 wherein said adjusting means includes a divider having at least one non-unitary temperature coefficient resistor, said divider coupled to said switch means whereby the switching of said switch means is relatively unaffected by temperature changes of said activating means.

18. An apparatus for controlling liquid levels, said apparatus comprising:
a pump;
a motor drivingly connected to said pump;
first sensor means for detecting the presence of liquid and mounted at a first vertical position, said first sensor means including a capacitive circuit having two capacitive electrodes, said first sensor means producing a first signal indicative of the presence of liquid at said first position;
second sensor means for detecting the presence of liquid and mounted at a second vertical position, which is different than said first vertical position, said second sensor means including a capacitive circuit having two capacitive electrodes, said second sensor means producing a second signal indicative of the presence of liquid at said second position;
means for activating said motor, said activating means operably coupled to said first and second sensor means, said activating means starting said motor to drive said pump when both of said first and second signals are produced by said first and second sensors, said activating means for continuing operation of said motor while at least one of said first and second signals are being produced, and said activating means stopping said motor when both said first and second signals are no longer produced;
said activating means including means for charging said capacitive sensors for a predetermined time period, said charging means including high frequency oscillator means for cycling the operation of said charging means at a frequency substantially exceeding line current.

19. The apparatus of claim 18 wherein said pump further includes an outer case, and one of said electrodes for each of said first and second sensor means includes said pump outer case.

20. The apparatus of claim 18 wherein said activating means includes means for stopping said motor when the temperature of said system exceeds a predetermined level.

21. The apparatus of claim 18 wherein said first sensor means includes a monostable multivibrator.

22. The apparatus of claim 18 wherein said second sensor means includes a monostable multivibrator.

23. The apparatus of claim 18 wherein said at least one of said electrodes for one of said first and second sensor means is vertically moveable.

24. The apparatus of claim 23 wherein said pump includes mounting means for adjustably positioning said vertically moveable electrode.

25. The apparatus of claim 18 further comprising a dielectrically isolated box attached to said pump and heatsink means for dissipating heat of said activating means which is disposed within said box.

26. The apparatus of claim 25 wherein one of said electrodes of said first sensor means includes a conductive plate, and said heatsink means includes said conductive plate as well.

27. The apparatus of claim 25 wherein said activating means includes power switching means for providing electric power to said motor, and said power switching means is disposed in thermal contact with said heatsink means.

28. The apparatus of claim 18 further including latching means for coupling said motor to a power source, said latching means including first, second, and gate terminals, said first and second terminals coupled in a series circuit relationship with said motor and the power source, said gate terminal coupled to said activating means, whereby said latching means closes said series circuit when activated by said activating means.

29. The apparatus of claim 28 wherein said latching means further includes a switch means for maintaining said latching means in a closed state, said switch means coupled to said activating means whereby after said latching means closes said series circuit, said switch means maintains said latching means in said closed state when said activating means indicates at least one of said first and second signals are being produced.

30. The apparatus of claim 28 wherein said activating means includes means for adjusting to ambient temperature changes, said adjusting means coupled to said switch means whereby the switching of said switch means is relatively unaffected.

31. The apparatus of claim 30 wherein said adjusting means includes a divider having at least one non-unitary temperature coefficient resistor, said divider coupled to said switch means whereby the switching of said switch means is relatively unaffected by temperature changes of said activating means.

* * * * *